United States Patent
Arii

(10) Patent No.: US 9,551,517 B2
(45) Date of Patent: Jan. 24, 2017

(54) REFRIGERATION CYCLE APPARATUS

(75) Inventor: Yusuke Arii, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 305 days.

(21) Appl. No.: 14/114,237

(22) PCT Filed: Apr. 4, 2012

(86) PCT No.: PCT/JP2012/002338
§ 371 (c)(1),
(2), (4) Date: Nov. 14, 2013

(87) PCT Pub. No.: WO2013/001688
PCT Pub. Date: Jan. 3, 2013

(65) Prior Publication Data
US 2014/0053587 A1    Feb. 27, 2014

(30) Foreign Application Priority Data
Jun. 29, 2011   (JP) .................. 2011-144901

(51) Int. Cl.
*F25B 41/04*    (2006.01)
*F25B 49/02*    (2006.01)
*F25B 6/02*     (2006.01)

(52) U.S. Cl.
CPC .......... *F25B 41/043* (2013.01); *F25B 49/022* (2013.01); *F25B 6/02* (2013.01); *F25B 2400/075* (2013.01); *F25B 2600/01* (2013.01); *F25B 2600/021* (2013.01); *F25B 2600/0271* (2013.01); *F25B 2600/2509* (2013.01);
(Continued)

(58) Field of Classification Search
CPC ... F25B 41/043; F25B 49/022; F25B 2600/01; F25B 2600/2515
See application file for complete search history.

(56) References Cited

U.S. PATENT DOCUMENTS 4,912,936 A * 4/1990 Denpou ............... F25B 49/022
                                                    361/22
5,816,055 A * 10/1998 Ohman ................. F04C 28/12
                                                    62/117
(Continued)

FOREIGN PATENT DOCUMENTS

JP    59-217458 A    12/1984
JP    61-243257 A    10/1986
(Continued)

OTHER PUBLICATIONS

Sim Won et al., Operation Method of Air Conditioning System, Mar. 3, 2005, JP2005055163A, Whole Document.*
(Continued)

*Primary Examiner* — Larry Furdge
(74) *Attorney, Agent, or Firm* — Posz Law Group, PLC

(57) ABSTRACT

A refrigeration cycle apparatus includes a controller configured to control opening and closing of a solenoid valve and that of a solenoid valve depending on any of a time when a compressor is activated, a time when the compressor is in normal operation, a time when a temperature of a motor of the compressor rises in the normal operation, and a time when the compressor stopped due to low-pressure cutoff is activated.

12 Claims, 6 Drawing Sheets

(52) U.S. Cl.
CPC ............. *F25B 2600/2515* (2013.01); *F25B 2700/21152* (2013.01); *Y02B 30/741* (2013.01)

(56) References Cited

U.S. PATENT DOCUMENTS

| | | | | |
|---|---|---|---|---|
| 2005/0262859 | A1* | 12/2005 | Crane | F25B 49/025 62/197 |
| 2010/0115975 | A1* | 5/2010 | Mitra | F25B 1/10 62/196.1 |
| 2010/0293397 | A1* | 11/2010 | Pham | F04B 49/065 713/300 |

FOREIGN PATENT DOCUMENTS

| | | | |
|---|---|---|---|
| JP | 05-340615 A | | 12/1993 |
| JP | 2002-130850 A | | 5/2002 |
| JP | 2005055163 A | * | 3/2005 |
| JP | 2008-138923 A | | 6/2008 |
| JP | 2008-180420 A | | 8/2008 |
| JP | 2008-185321 A | | 8/2008 |
| JP | 2010117072 A | * | 5/2010 |
| JP | 2011-027347 A | | 2/2011 |

OTHER PUBLICATIONS

Tanaka et al., Refrigerating Device, May 27, 2010, JP2010117072A, Whole Document.*
Toshio et al., Refrigerating Plant, Feb. 9, 2002, JP2002130850A, Whole Document.*
Takeshi et al., Air Conditioner, Jun. 19, 2008, JP2008138923A, Whole Document.*
Office Action mailed Dec. 17, 2014 issued in corresponding CN patent application No. 201280025531.5 (and English translation).
Office Action mailed Nov. 4, 2014 issued in corresponding JP patent application No. 2013-522687 (and English translation).
International Search Report of the International Searching Authority mailed Jul. 10, 2012 for the corresponding international application No. PCT/JP2012/002338 (with English translation).

* cited by examiner (a)

(b)

F I G. 3
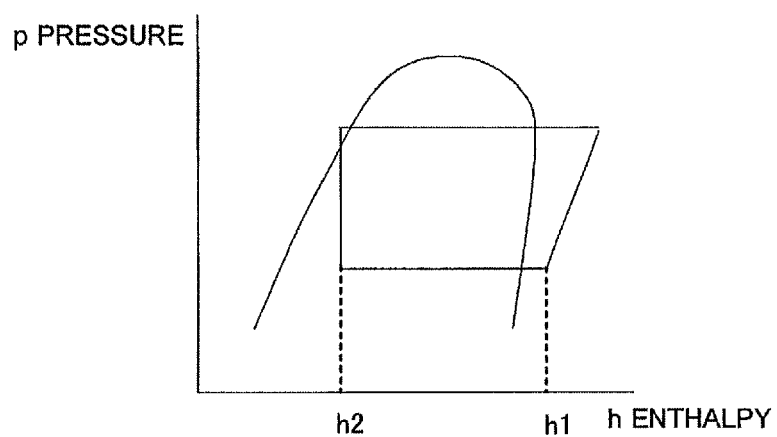
F I G. 4
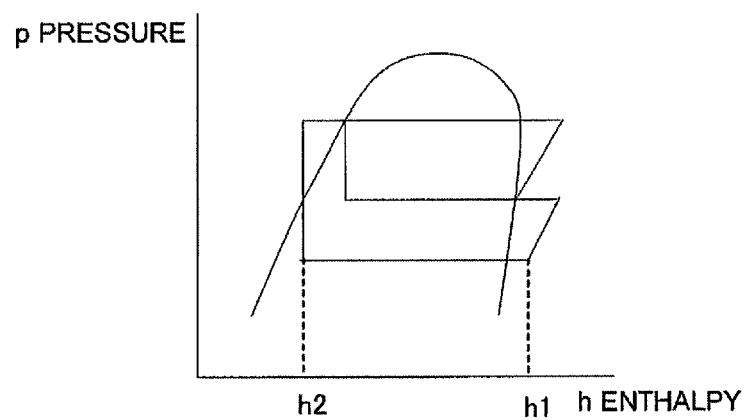

REFRIGERATION CYCLE APPARATUS

CROSS REFERENCE TO RELATED APPLICATION

This application is a U.S. national stage application of International Application No. PCT/JP2012/002338 filed on Apr. 4, 2012, and claims priority to, and incorporates by reference, Japanese Patent Application No. 2011-144901 filed on Jun. 29, 2011.

TECHNICAL FIELD

The present invention relates to a refrigeration cycle apparatus including a compressor capable of being subjected to injection.

BACKGROUND ART

There have been refrigeration cycle apparatuses including compressors capable of being subjected to injection. One of purposes of injection into a compressor is to reduce a discharge temperature of a refrigerant discharged from the compressor. Methods for reducing a discharge temperature of a gas refrigerant discharged from a compressor include a method of injecting the refrigerant into an intermediate pressure portion (intermediate port) of the compressor, a method of injecting the refrigerant into a suction side of the compressor, and a method being a combination of these methods.

Some of refrigeration cycle apparatuses using the method of injecting the refrigerant into the suction side of the compressor are intended for reducing the temperature of a refrigerating machine oil in the compressor and the temperature of a motor of the compressor (refer to Patent Literature 1, for example). Some of refrigeration cycle apparatuses using the combination of the two injection methods are intended for avoiding fracture of the compressor caused by liquid compression during activation of the compressor (refer to Patent Literature 2, for example).

CITATION LIST

Patent Literature

Patent Literature 1: Japanese Unexamined Patent Application Publication No. 59-217458 (p. 2, FIG. 1, for example)
Patent Literature 2: Japanese Unexamined Patent Application Publication No. 5-340615 (pp. 3-4, FIG. 1, for example)

SUMMARY OF INVENTION

Technical Problem

Refrigeration cycle apparatuses using the method of injecting the refrigerant into the intermediate pressure portion of the compressor offer an advantage in that refrigeration capacity can be enhanced in a configuration enabling subcooling with a double pipe coil or the like. Since the refrigerant is directly injected into the intermediate pressure portion of the compressor, however, the injection of the refrigerant in a liquid state, if in large quantity, might lead to liquid compression. Disadvantageously, this may cause undesirable activation conditions of the compressor.

The refrigeration cycle apparatus disclosed in Patent Literature 1 offers an advantage of reducing not only the discharge temperature but also the temperature of the motor of the compressor (and the temperature of the oil). This advantage is especially effective in an area where an evaporating temperature is low at which the temperature of the motor tends to rise. On the other hand, disadvantageously, the refrigeration capacity is reduced because the amount of refrigerant circulated in such a circuit decreases. Furthermore, since a bypass between a high-pressure side and a low-pressure side is provided, a low-pressure-side pressure tends to increase. This may cause the effect of energy saving to reduce or may cause undesirable pump-down conditions.

The refrigeration cycle apparatus disclosed in Patent Literature 2 offers the advantage and disadvantage of the method of injecting the refrigerant into the intermediate pressure portion of the compressor and those of the method of injecting the refrigerant into the suction side of the compressor. Although two injection circuits operate at all times during refrigeration cycle operation, control of switching between the two injection circuits is not disclosed. Unfortunately, it is not clear how to control an injection flow rate and an injection pressure. It is therefore not clear that the refrigeration cycle can exhibit its full capacity.

The present invention has been made to overcome the above-described disadvantages. A first aspect of the present invention is to provide a refrigeration cycle apparatus that achieves injection control for improving activation performance of a compressor. In addition to the first aspect, a second aspect of the present invention is to provide a refrigeration cycle apparatus that achieves injection control for reducing the temperature of a motor of a compressor (or the temperature of oil in the compressor) without reducing its refrigeration capacity.

Solution to Problem

The present invention provides a refrigeration cycle apparatus including a heat source side circuit in which at least one compressor configured to compress a refrigerant and discharge the refrigerant, a condenser configured to exchange heat between the refrigerant discharged from the compressor and a heat medium, and a subcooling coil configured to subcool the refrigerant flowing from the condenser are connected by pipes, an injection circuit that branches off at a downstream side of the subcooling coil in the heat source circuit and connects through the subcooling coil to an intermediate pressure portion of the compressor, a bypass that branches off at a downstream side of the subcooling coil in the injection circuit and connects to a suction side of the compressor, a first solenoid valve disposed closer to the compressor than a connection point between the injection circuit and the bypass, a second solenoid valve disposed in the bypass, and a controller configured to control a frequency of the compressor, opening and closing of the first solenoid valve, and opening and closing of the second solenoid valve. The controller controls the opening and closing of the first and second solenoid valves depending on any of a time when the compressor is activated, a time when the compressor is in normal operation, a time when a temperature of a motor of the compressor rises in the normal operation, and a time when the compressor stopped due to low-pressure cutoff is activated.

Advantageous Effects of Invention

According to the invention, the refrigeration cycle apparatus is configured to use the injection circuit or the bypass depending on any of the time when the compressor is activated, the time when the compressor is in the normal operation, the time when the temperature of the motor of the compressor rises in the normal operation, and the time when the compressor stopped due to low-pressure cutoff is activated. Advantageously, the activation performance of the compressor (during normal activation or activation from a stopped state due to low-pressure cutoff) can be improved while a reduction in refrigeration capacity is being prevented. Furthermore, the temperature of the motor of the compressor can be reduced.

BRIEF DESCRIPTION OF DRAWINGS

FIG. 3 is a pressure-enthalpy diagram illustrating a refrigerant state transition without injection control in a refrigeration cycle apparatus according to Embodiment 2 of the invention.

FIG. 4 is a pressure-enthalpy diagram illustrating a refrigerant state transition with intermediate injection control in the refrigeration cycle apparatus according to Embodiment 2 of the invention.

DESCRIPTION OF EMBODIMENTS

Embodiments of the present invention will be described below with reference to the drawings.

Embodiment 1

Figure 1:
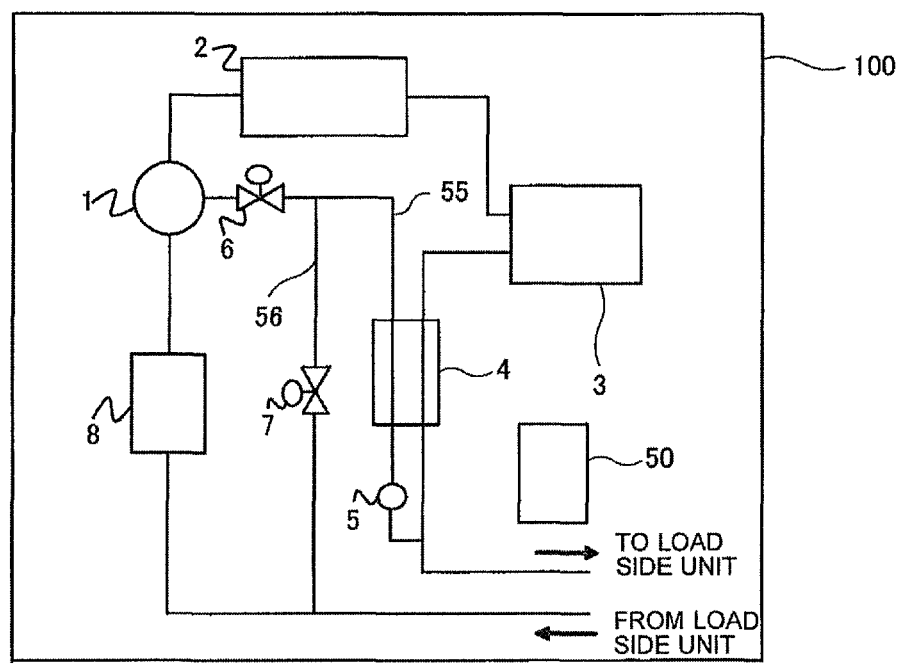
FIG. 1 is a schematic diagram illustrating an exemplary configuration of a refrigerant circuit of a refrigeration cycle apparatus according to Embodiment 1 of the present invention.

FIG. 1 is a schematic diagram illustrating an exemplary configuration of a refrigerant circuit of a refrigeration cycle apparatus 100 according to Embodiment 1 of the invention. A configuration and operation of the refrigeration cycle apparatus 100 will be described with reference to FIG. 1. Note that the dimensional relationship among components in FIG. 1 and the following figures may be different from the actual one. Furthermore, note that components designated by the same reference numerals in FIG. 1 and the following figures are the same components or equivalents. The above notes are intended to be common throughout this specification. Furthermore, note that the forms of components described in the specification are intended to be illustrative only and are not intended to be limited to the descriptions.

The refrigeration cycle apparatus 100 according to Embodiment 1 achieves injection control for improving undesirable activation conditions during activation of a compressor 1. Furthermore, the refrigeration cycle apparatus 100 according to Embodiment 1 achieves injection control for enhancing its refrigeration capacity in normal operation of the compressor 1. In addition, the refrigeration cycle apparatus 100 according to Embodiment 1 achieves injection control for reducing the temperature of a motor of the compressor 1 (or the temperature of oil in the compressor) without reducing the refrigeration capacity. The refrigeration cycle apparatus 100 is used as an outdoor unit of, for example, a refrigerator, a freezer, an air-conditioning apparatus, or a display case.

The refrigeration cycle apparatus 100 includes a heat source side circuit in which the inverter compressor 1 (hereinafter, referred to as the "compressor 1"), a condenser 2 configured to exchange heat between a gas refrigerant discharged from the compressor 1 and air to condense the refrigerant, a reservoir 3 configured to store a liquid refrigerant flowing from the condenser 2, a subcooling coil 4 configured to subcool the liquid refrigerant flowing from the reservoir 3, and an accumulator 8 configured to separate the refrigerant returning from a load side unit (load side unit including at least an expansion valve configured to reduce the pressure of the refrigerant and a cooler (load side heat exchanger) configured to exchange heat between the pressure-reduced refrigerant and the air to evaporate the refrigerant, the expansion valve and the cooler being connected in series) into gas and liquid phases are connected in series by refrigerant pipes. The condenser 2 functions as a radiator depending on refrigerant.

The refrigeration cycle apparatus 100 further includes an injection circuit 55 that branches off of the pipe downstream of the subcooling coil 4 in the heat source side circuit and connects to an intermediate pressure portion (intermediate port) of the compressor 1. In addition, the refrigeration cycle apparatus 100 includes a bypass 56 that connects the pipe between the subcooling coil 4 and the compressor 1 in the injection circuit 55 to the pipe between the load side unit and the accumulator 8. An electronic expansion valve 5 is disposed on an inlet side of the injection circuit 55 adjacent to the subcooling coil 4. A solenoid valve (second solenoid valve) 7 is disposed in the bypass 56. A solenoid valve (first solenoid valve) 6 is disposed between the compressor 1 and a connection point between the injection circuit 55 and the bypass 56.

Accordingly, the refrigeration cycle apparatus 100 can divide the liquid refrigerant flowing from the subcooling coil 4 into two parts such that one part flows to the load side unit and the other part flows to the injection circuit 55. The refrigerant flowing into the injection circuit 55 is pressure-reduced by the electronic expansion valve 5 and then exchanges heat with the liquid refrigerant flowing from the reservoir 3 in the subcooling coil 4, and is then injected through the solenoid valve 6 into the intermediate port of the compressor 1. Furthermore, the refrigeration cycle apparatus 100 enables the refrigerant flowing through the injection circuit 55 to flow through the bypass 56 to a suction side of the compressor 1 (or an upstream side of the accumulator 8). Allowing the refrigerant to flow through the bypass 56 to the suction side of the compressor 1 may also be referred to as "suction injection". Note that the solenoid valve 6 and the solenoid valve 7 are closed while the compressor 1 is stopped.

The compressor 1 is configured to compress the refrigerant to a high-temperature high-pressure state and discharge the resultant refrigerant. The compressor 1 is configured such that the refrigerant flowing through the injection circuit 55 can be injected into the intermediate pressure portion of the compressor 1. The compressor 1 is of a capacity-controllable type whose rotation speed can be variably controlled by an inverter. The compressor 1 may be any of various types of compressors, such as rotary, screw, reciprocal, and scroll compressors.

The condenser 2 is configured to exchange heat between the refrigerant discharged from the compressor 1 and a heat medium, such as air or water, such that the refrigerant condenses and liquefies. The reservoir 3 is disposed between the condenser 2 and the subcooling coil 4 in the heat source side circuit and is configured to store the refrigerant flowing from the condenser 2. The subcooling coil 4 comprises a double pipe coil and is configured to exchange heat between the refrigerant flowing from the reservoir 3 and the refrigerant flowing through the injection circuit 55. The accumulator 8 is disposed on the suction side of the compressor 1 and is configured to separate the refrigerant into gas and liquid phases and store an excess of refrigerant.

The electronic expansion valve 5 has a variably controllable opening degree and is configured to reduce the pressure of the refrigerant flowing through the injection circuit 55 such that the refrigerant is expanded. The solenoid valve 6 is configured to open or close the injection circuit 55 in an electromagnetic manner. Specifically, whether the refrigerant is injected into the compressor 1 is determined by electromagnetically controlling opening and closing of the solenoid valve 6. The solenoid valve 7 is configured to open or close the bypass 56 in an electromagnetic manner. Specifically, whether the refrigerant is permitted to flow through the bypass 56 is determined by opening and closing of the solenoid valve 7.

The refrigeration cycle apparatus 100 includes a controller 50 that includes a microcomputer capable of performing centralized control on the entire apparatus. The controller 50 has functions for control over a driving frequency of the compressor 1, control over the opening degree of the electronic expansion valve 5, control over the opening and closing of the solenoid valves 6 and 7, and the like. The controller 50 is configured to control these actuators (e.g., the compressor 1, the electronic expansion valve 5, the solenoid valve 6, and the solenoid valve 7) to execute any of various operations which will be described later.

The flow of refrigerant in basic operation of the refrigeration cycle apparatus 100 will now be described.

A high-temperature high-pressure gas refrigerant compressed by the compressor 1 flows into the condenser 2, exchanges heat with the heat medium supplied to the condenser 2 to transfer heat to the heat medium such that the refrigerant turns into a high-pressure liquid refrigerant, and flows out of the condenser 2. The high-pressure liquid refrigerant, which has flowed out of the condenser 2, flows into the reservoir 3. The refrigerant, which has flowed out of the reservoir 3, flows into the subcooling coil 4. If the refrigerant flows through the injection circuit 55, the refrigerant flowing into the subcooling coil 4 is subcooled by the refrigerant flowing through the injection circuit 55. The refrigerant, which has flowed out of the subcooling coil 4, is used in the load side unit and is again sucked into the compressor 1 through the accumulator 8.

The injection into the compressor 1 and the flow of refrigerant through the bypass 56 are determined by opening and closing of the solenoid valves 6 and 7. The refrigeration cycle apparatus 100 is therefore configured such that the opening and closing of the solenoid valves 6 and 7 can be controlled at optimum timing. First, the timing of opening and closing of the solenoid valves 6 and 7 during activation of the compressor 1 will be described. Then, the timing of opening and closing of the solenoid valves 6 and 7 for enhancement of the refrigeration capacity in the normal operation of the compressor 1 will be described. After that, the timing of opening and closing of the solenoid valves 6 and 7 for reduction of the temperature of the motor of the compressor 1 will be described. A refrigeration cycle apparatus including a plurality of refrigerant circuits will be described in Embodiment 2, and return from a pump-down stopped state will be described in Embodiment 3.

[Timing of Opening and Closing of Solenoid Valves 6 and 7 During Activation of Compressor 1]

Figure 2:
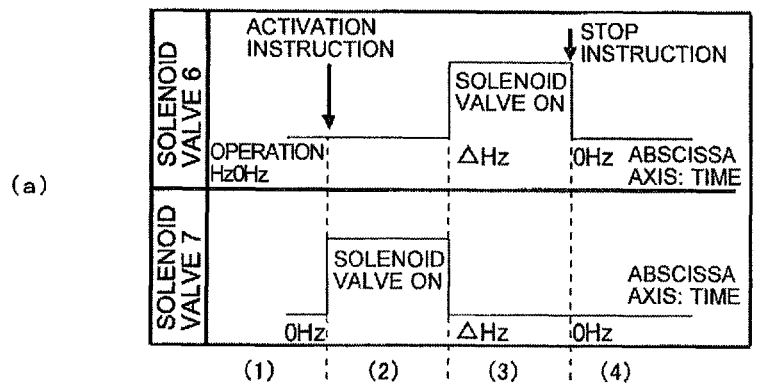
FIG. 2 includes diagrams for explaining the timing of opening and closing of solenoid valves of the refrigeration cycle apparatus according to Embodiment 1 of the invention.
Figure 2:
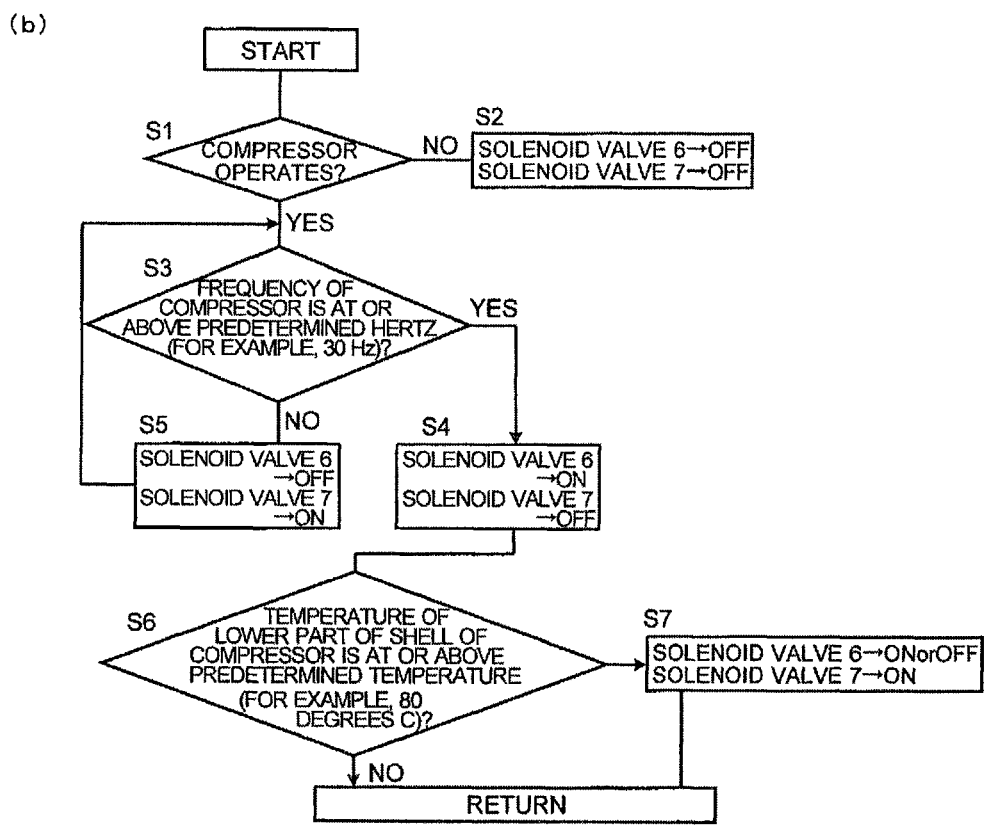

FIG. 2 includes diagrams for explaining the timing of opening and closing of the solenoid valves (the solenoid valve 6 and the solenoid valve 7) in the refrigeration cycle apparatus 100. FIG. 2(*a*) is a timing chart of control over the opening and closing of the solenoid valves 6 and 7. FIG. 2(*b*) is a flowchart illustrating a process of controlling the opening and closing of the solenoid valves 6 and 7.

As described above, while the compressor 1 is stopped, the solenoid valves 6 and 7 are closed ((1) in FIG. 2(*a*), S1 and S2 in FIG. 2(*b*)). Accordingly, the refrigerant in the injection circuit 55 is a high-pressure liquid refrigerant. If the compressor 1 is activated in this state, the high-pressure liquid refrigerant would be injected into the intermediate port of the compressor 1. In this case, the compressor 1 would enter a liquid compression state, in which torque acting on the compressor 1 is large and overcurrent flows. In the refrigeration cycle apparatus 100, therefore, the solenoid valve 6 is closed and the solenoid valve 7 is opened ((2) in FIG. 2(*a*), S3 and S5 in FIG. 2(*b*)) during activation of the compressor 1 (until a driving frequency of the compressor 1 reaches a predetermined frequency (e.g., 30 Hz)).

Accordingly, the liquid refrigerant does not flow into the intermediate port of the compressor 1, because the solenoid valve 6 is closed during activation of the compressor 1 until the driving frequency reaches the predetermined frequency. Consequently, liquid compression is avoided during activation of the compressor 1, so that overcurrent can be prevented from flowing during activation of the compressor 1. Furthermore, the whole of the liquid refrigerant in the injection circuit 55 can be allowed to flow to the low-pressure side through the bypass 56, because the solenoid valve 7 is opened at the same time. Consequently, there is little liquid refrigerant in the injection circuit 55 at the time when the solenoid valve 6 is opened ((3) in FIG. 2(*a*), S3 and S4 in FIG. 2(*b*)) in turn (when the driving frequency of the compressor 1 reaches the predetermined frequency (e.g., 30 Hz) or higher). Accordingly, liquid compression does not occur in the compressor 1.

As described above, the refrigeration cycle apparatus 100 can achieve injection control for improving undesirable activation conditions during activation of the compressor 1 and therefore enables the compressor 1 to continuously operate while smoothly shifting from activation to normal operation.

[Timing of Opening and Closing of Solenoid Valves 6 and 7 for Enhancement of Refrigeration Capacity in Normal Operation]

FIG. 3 is a pressure-enthalpy diagram illustrating a refrigerant state transition without injection control in the refrigeration cycle apparatus 100. FIG. 4 is a pressure-enthalpy diagram illustrating a refrigerant state transition with injection control in the refrigeration cycle apparatus 100. The timing of opening and closing of the solenoid valves 6 and 7 for enhancement of the refrigeration capacity in the normal operation of the compressor 1 will be described with reference to FIGS. 1 to 4. The refrigeration capacity is indicated by the product of the amount of refrigerant circulated and the difference in enthalpy. The enthalpy difference is indicated by h1-h2 in FIG. 3.

The injection control results in an increase in enthalpy difference h1-h2 (refer to FIG. 4) because the subcooling coil 4 provides sufficient subcooling. Accordingly, the entire refrigeration capacity is larger than that in the case without injection control. Furthermore, in the case with suction injection through the bypass 56, the subcooling coil 4 provides sufficient subcooling and the enthalpy difference is the same as that in the case with injection into the intermediate port. Since the amount of refrigerant circulated in the case with injection into the suction side is lower than that in the case with injection into the intermediate port, however, the refrigeration capacity is lower than that in the case with injection into the intermediate port.

As described above, since the suction injection results in a reduction in amount of refrigerant circulated in the normal operation, the refrigeration capacity is reduced. In the refrigeration cycle apparatus 100, part of the liquid refrigerant flowing into the injection circuit 55 is pressure-reduced by the electronic expansion valve 5 and the pressure-reduced two-phase refrigerant is allowed to exchange heat with the liquid refrigerant, thus providing subcooling. To enhance the refrigeration capacity, the refrigerant has to be injected into the intermediate port of the compressor 1. In the refrigeration cycle apparatus 100, therefore, the solenoid valve 6 is opened and the solenoid valve 7 is closed in the normal operation of the compressor 1 ((3) in FIG. 2(a), S3 and S4 in FIG. 2(b)). Note that the normal operation used herein means a state in which the frequency of the compressor 1 has reached the predetermined frequency (e.g., 30 Hz) or higher.

Figure 5:
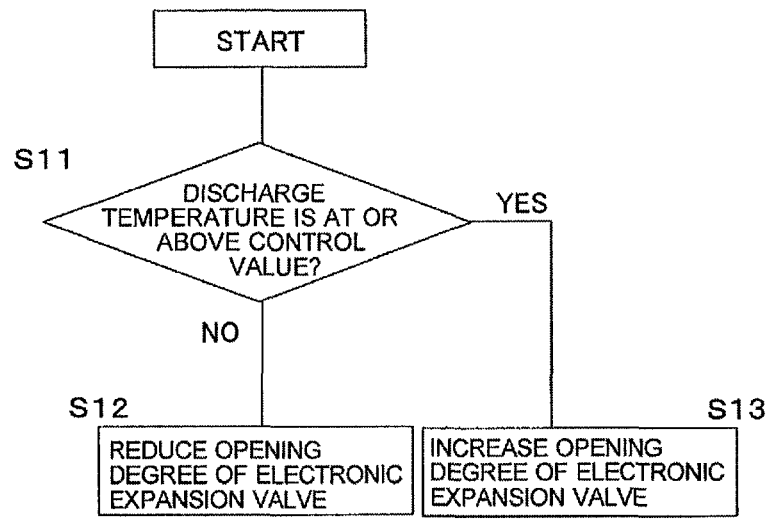
FIG. 5 is a flowchart illustrating the flow of a process of controlling an electronic expansion valve of the refrigeration cycle apparatus according to Embodiment 2 of the invention.

An example of control over the electronic expansion valve 5 will now be described. FIG. 5 is a flowchart illustrating the flow of a process of controlling the electronic expansion valve 5. The opening degree of the electronic expansion valve 5 is controlled depending on a temperature (discharge temperature) detected by a temperature sensor (thermistor) (not illustrated) disposed in the pipe on the discharge side of the compressor 1.

Specifically, if the temperature detected by the temperature sensor is at or below a control value (for example, 100 degrees C.) for the discharge temperature of the refrigerant discharged from the compressor 1 (NO in S11 in FIG. 5), the controller 50 performs control to reduce the opening degree of the electronic expansion valve 5 such that the discharge temperature rises (S12 in FIG. 5). On the other hand, if the temperature detected by the temperature sensor is at or above the control value for the discharge temperature (YES in S11 in FIG. 5), the controller 50 performs control to increase the opening degree of the electronic expansion valve 5 such that the discharge temperature falls (S13 in FIG. 5).

Note that the opening degree of the electronic expansion valve 5 is not fully closed while the compressor 1 is stopped.

The above-described control over the opening degree of the electronic expansion valve 5 is just an example. Another control may be used. For example, a temperature sensor (thermistor) may be disposed in a liquid pipe which extends from an outlet of the subcooling coil 4 to the load side unit, the amount of subcooling in the subcooling coil 4 may be calculated on the basis of the temperature of the liquid refrigerant, and the opening degree of the electronic expansion valve 5 may be controlled on the basis of the amount of subcooling.

As described above, since the refrigeration cycle apparatus 100 is configured such that the refrigerant is injected into the intermediate port of the compressor 1 in the normal operation of the compressor 1, the refrigeration capacity can be enhanced.

[Timing of Opening and Closing of Solenoid Valves 6 and 7 for Reduction of Temperature of Motor of Compressor 1]

In cases where the refrigeration cycle apparatus 100 is used in an area where an evaporating temperature is low, the amount of refrigerant circulated is small and it is therefore difficult to cool heat generated by the motor of the compressor 1. In such a pattern that the refrigerant is injected into the intermediate port of the compressor 1, heat generation by the motor of the compressor 1 cannot be reduced. Unfortunately, the compressor 1 may be abnormally stopped in order to control protection of motor winding. If the compressor 1 is abnormally stopped, the compressor 1 would restart its operation after the temperature of the motor falls. If the temperature of the motor rises to such an extent that the compressor 1 is abnormally stopped, it may take a long time to reduce the temperature of the motor. Disadvantageously, this may increase duration when the refrigeration cycle apparatus 100 cannot be operated, resulting in a reduction in refrigeration capacity.

To avoid abnormal stop of the compressor 1, therefore, the temperature of the motor has to be reduced by performing suction injection such that the compressor 1 is allowed to directly suck a low-temperature refrigerant. In the refrigeration cycle apparatus 100, while the temperature of the motor of the compressor 1 rises, the solenoid valve 6 is closed (or may be opened) and the solenoid valve 7 is opened ((4) in FIG. 2(a), S6 and S7 in FIG. 2(b)). In the case that both the solenoid valve 6 and the solenoid valve 7 are opened, a pressure reducing device, such as a capillary tube, has to be disposed on the low-pressure side of the solenoid valve 7.

As described above, in the normal operation of the compressor 1, the suction injection results in a reduction in refrigeration capacity. Although the refrigeration capacity is reduced to some extent, the refrigeration capacity can be maintained higher than that in the abnormal stop of the compressor 1. It is therefore preferable that suction injection be performed when the temperature of the motor of the compressor 1 rises.

It is difficult to directly measure the temperature of the motor of the compressor 1, because the motor is disposed within the compressor 1. Instead of measuring the temperature of the motor of the compressor 1, therefore, the temperature of refrigerating machine oil stored in the bottom of the compressor 1 may be measured by a temperature sensor (thermistor) disposed on lower part of a shell of the compressor 1. Specifically, "the time when the temperature of the motor of the compressor 1 rises" means a state in which a temperature detected by the temperature sensor (thermistor) disposed on the lower part of the shell of the compressor 1 has reached a certain value (for example, 80 degrees C.) or higher (S6 in FIG. 2(b)).

As described above, the refrigeration cycle apparatus 100 is configured such that while the temperature of the motor of the compressor 1 rises, the refrigerant is allowed to flow into the suction side of the compressor in order to reduce the temperature of the motor. Although the refrigeration capacity is reduced to some extent during suction injection, the compressor 1 can continuously operate without being stopped.

In addition to the suction injection, there are ways to reduce the temperature of the motor of the compressor 1. For example, the driving frequency of the compressor 1 is reduced to reduce heat generated by the motor. The above-described control for reduction of the temperature of the motor of the compressor 1 is, however, the most effective way to reduce the temperature of the motor of the compressor 1, because a low-temperature refrigerant is allowed to directly flow into the suction side of the compressor 1.

Embodiment 2

Figure 6:
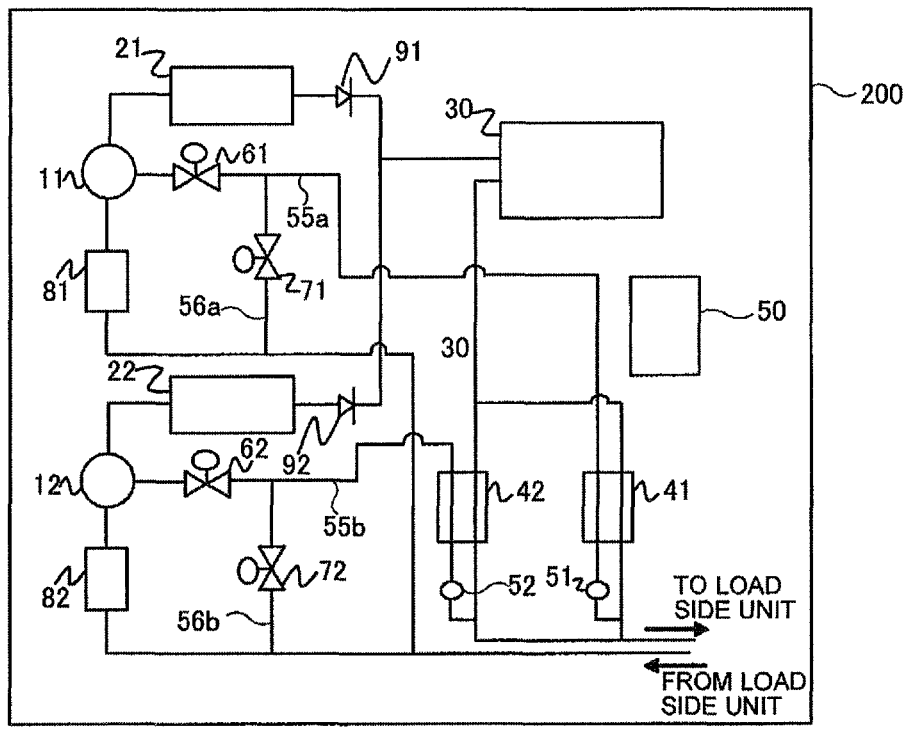
FIG. 6 is a schematic diagram illustrating a configuration of a refrigerant circuit of the refrigeration cycle apparatus according to Embodiment 2 of the invention.

FIG. 6 is a schematic diagram illustrating an exemplary configuration of a refrigerant circuit of a refrigeration cycle apparatus 200 according to Embodiment 2 of the invention. A configuration and operation of the refrigeration cycle apparatus 200 will be described with reference to FIG. 6. The difference between Embodiment 2 and Embodiment 1 discussed above will be mainly described and description of the same components, such as refrigerant circuit components, as those in Embodiment 1 will be omitted.

The refrigeration cycle apparatus 200 according to Embodiment 2 achieves injection control for improving undesirable activation conditions during activation of the compressor 1 in a manner similar to the refrigeration cycle apparatus 100. Furthermore, the refrigeration cycle apparatus 200 according to Embodiment 2 achieves injection control for enhancing refrigeration capacity in normal operation in a manner similar to the refrigeration cycle apparatus 100 according to Embodiment 1. Furthermore, the refrigeration cycle apparatus 200 according to Embodiment 2 achieves injection control for reducing the temperature of the motor of the compressor 1 (or the temperature of the oil in the compressor) without reducing the refrigeration capacity in a manner similar to the refrigeration cycle apparatus 100 according to Embodiment 1. The refrigeration cycle apparatus 200 is used as an outdoor unit of, for example, a refrigerator, a freezer, an air-conditioning apparatus, or a display case.

Although the single refrigerant circuit is illustrated in Embodiment 1, multiple refrigerant circuits (two refrigerant circuits in FIG. 6) are illustrated in Embodiment 2. The refrigeration cycle apparatus 200 including at least two inverter compressors (a compressor 11 and a compressor 12) can be allowed to perform injection controls similar to those in the refrigeration cycle apparatus 100 according to Embodiment 1.

The refrigeration cycle apparatus 200 is configured such that flows from the two refrigerant circuits are merged on an upstream side of a reservoir 30 and the resultant flow is again divided into two flows toward the two refrigerant circuits on a downstream side of the reservoir 30. A check valve 91 configured to permit the refrigerant to flow only in one direction is disposed between a condenser 21 and the reservoir 30, namely, downstream of the condenser 21. In addition, a check valve 92 configured to permit the refrigerant to flow only in one direction is disposed between a condenser 22 and the reservoir 30, namely, downstream of the condenser 22. The refrigeration cycle apparatus 200 includes the check valves 91 and 92 and is configured such that, for example, while the compressor 11 operates and the compressor 12 is stopped, the refrigerant is prevented from flowing backward to the compressor 12.

The compressor 1, the condenser 2, the reservoir 3, the subcooling coil 4, the electronic expansion valve 5, the solenoid valve 6, the solenoid valve 7, the accumulator 8, the injection circuit 55, and the bypass 56 in the refrigeration cycle apparatus 100 correspond to the compressors 11 and 12, the condensers 21 and 22, the reservoir 30, subcooling coils 41 and 42, electronic expansion valves 51 and 52, solenoid valves 61 and 62, solenoid valves 71 and 72, accumulators 81 and 82, injection circuits 55a and 55b, and bypasses 56a and 56b in the refrigeration cycle apparatus 200, respectively.

In a circuit including at least two compressors (the compressors 11 and 12) like the refrigeration cycle apparatus 200, since the check valves (the check valves 91 and 92) are connected, a discharge pressure of each compressor (on an upstream side of the corresponding check valve) may be lower than a pressure on a liquid outlet side of a heat source unit (on a downstream side of the corresponding check valve). In this case, while the stopped compressor (e.g., the compressor 12) is activated, the pressure of the refrigerant in the compressor 12 temporarily enters a back-pressure state during control in which the refrigerant is injected into the intermediate port of the compressor 12. Specifically, the pressure relationship in the compressor 12 is as follows: a pressure on a suction side of the compressor 12 is low, a pressure in the intermediate port of the compressor 12 is high, and a pressure on a discharge side of the compressor 12 is substantially medium (i.e., higher than the pressure on the suction side of the compressor 12 and lower than the pressure of the intermediate port of the compressor 12) (suction side:intermediate port:discharge side=low:high:medium).

Accordingly, acting torque is larger than that in the circuit including a single compressor, so that undesirable activation conditions due to overcurrent tend to occur. In other words, the control described in Embodiment 1 is more effective in the parallel connection of at least two compressors. In particular, while at least one compressor is operating, such a phenomenon becomes noticeable when another compressor is activated.

As described above, the refrigeration cycle apparatus 200 can achieve injection control for improving undesirable activation conditions during activation of the compressor 1 and therefore enables the compressor 1 to operate while smoothly shifting from activation to normal operation. In addition, since the refrigeration cycle apparatus 200 is configured such that the refrigerant is injected into the intermediate port of the compressor 1 in the normal operation of the compressor 1, the refrigeration capacity can be enhanced. Furthermore, the refrigeration cycle apparatus 200 is configured such that while the temperature of the motor of the compressor 1 rises, the refrigerant is allowed to flow into the suction side of the compressor in order to reduce the temperature of the motor. Accordingly, although the refrigeration capacity is reduced to some extent during suction injection, the compressor 1 can continuously operate without being stopped.

Embodiment 3

Figure 7:
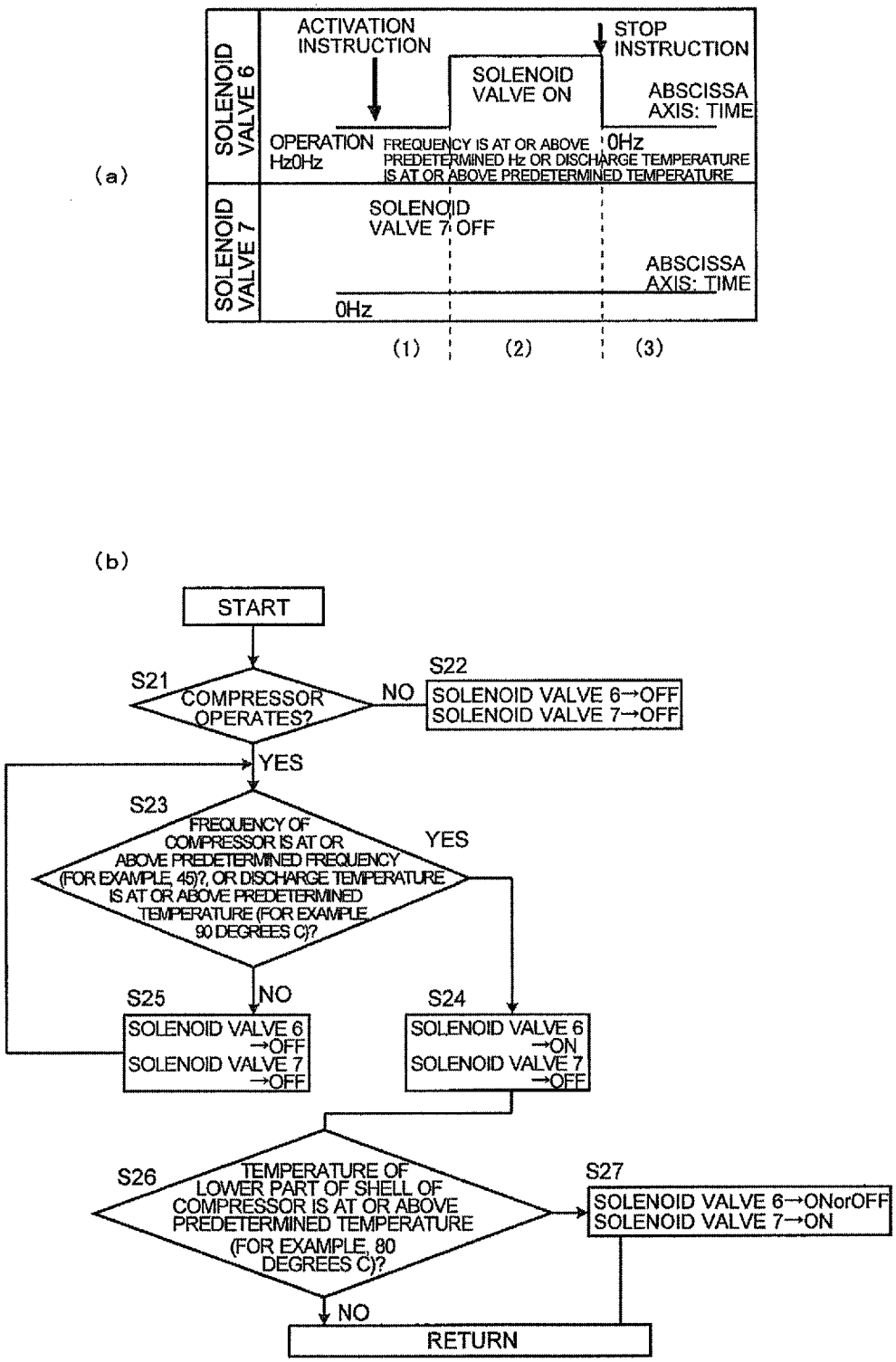
FIG. 7 includes diagrams for explaining the timing of opening and closing of solenoid valves of a refrigeration cycle apparatus according to Embodiment 3 of the invention.
Figure 8:
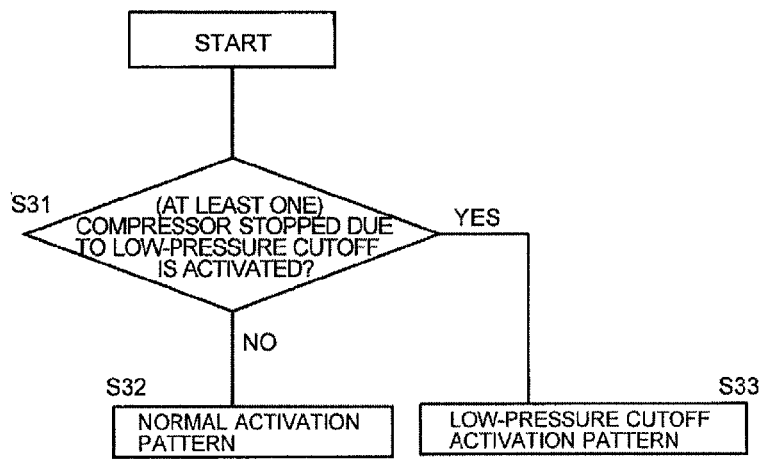
FIG. 8 is a flowchart illustrating the flow of a process of determining a pattern of opening and closing of the solenoid valves of the refrigeration cycle apparatus according to Embodiment 3 of the invention.
Figure 9:
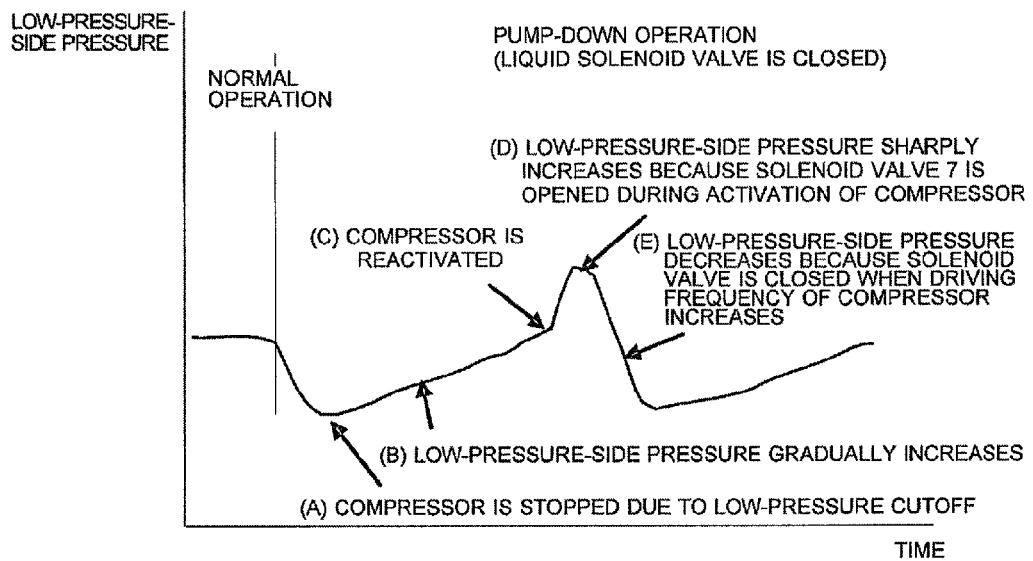
FIG. 9 is a diagram illustrating an increase in low-pressure-side pressure during pump-down of the refrigeration cycle apparatus according to Embodiment 3 of the invention.

FIG. 7 includes diagrams for explaining the timing of opening and closing of solenoid valves in a refrigeration cycle apparatus according to Embodiment 3 of the invention. FIG. 8 is a flowchart illustrating the flow of a process of determining a pattern of opening and closing of the solenoid valves in the refrigeration cycle apparatus according to Embodiment 3. FIG. 9 is a diagram schematically illustrating an increase in low-pressure-side pressure during pump-down of the refrigeration cycle apparatus according to Embodiment 3. Features of the refrigeration cycle apparatus according to Embodiment 3 will be described with reference to FIGS. 7 to 9. The difference between Embodiment 3 and Embodiments 1 and 2 discussed above will be mainly described and description of the same components, such as refrigerant circuit components, as those in Embodiments 1 and 2 will be omitted. FIG. 7(a) is a timing chart of control over the opening and closing of the solenoid valves 6 and 7. FIG. 7(b) is a flowchart illustrating the flow of a process of controlling the opening and closing of the solenoid valves 6 and 7.

The refrigeration cycle apparatus according to Embodiment 3 has the same circuitry as that of the refrigeration cycle apparatus 100 according to Embodiment 1 or the refrigeration cycle apparatus 200 according to Embodiment 2 and further has a feature of controlling the solenoid valves 6 and 7 while the compressor 1 is activated so as to return from a pump-down stopped state (low-pressure cutoff).

[Timing of Opening and Closing of Solenoid Valves 6 and 7 During Return from Pump-Down Stopped State]

To defrost the load side unit, for example, generally, a liquid solenoid valve (typically disposed upstream of an evaporator and an expansion unit) (not illustrated in the refrigeration cycle according to Embodiment 3) is closed to cause pump-down such that the refrigerant on the low-pressure side is stored on the high-pressure side, as illustrated in FIG. 9. Since the refrigerant on the low-pressure side is moved to the high-pressure side, a low-pressure-side pressure decreases and the compressor is then stopped due to low-pressure cutoff (indicated by arrow (A) in FIG. 9). Typically, after the compressor is stopped due to low-pressure cutoff, the low-pressure-side pressure gradually increases due to, for example, deposition of the refrigerant dissolved in the refrigerating machine oil or a small leakage of the refrigerant from a valve unit in the circuit (indicated by arrow (B) in FIG. 9). The compressor may be reactivated when the low-pressure-side pressure reaches a certain value or higher (indicated by arrow (C) in FIG. 9).

In many cases, during defrosting, a defrost heater in the load side unit is turned on or off by turn on or off of the compressor. In cases where the compressor is stopped or activated very often or operating time is long during pump-down (in which the liquid solenoid value is closed), turn-on time of the heater decreases. Consequently, for example, the time required to completely melt frost on the heat exchanger in the load side unit may be increased, or the defrosting operation may terminate before the frost completely melts. This may lead to poor defrosting.

In the refrigeration cycle apparatus 100, as described in Embodiment 1, the solenoid valve 7 is opened while the compressor 1 is activated. Specifically, since the high-pressure side and the low-pressure side are connected through the bypass 56 during activation of the compressor 1, the refrigerant temporarily stored on the high-pressure side is again returned to the low-pressure side, so that the low-pressure-side pressure increases. Unfortunately, the low-pressure-side pressure increases due to deposition of the refrigerant dissolved in the refrigerating machine oil during pump-down or a small leakage of the refrigerant from the valve unit in the circuit, so that the low-pressure-side pressure sharply increases upon reactivation of the compressor 1 (indicated by arrow (D) in FIG. 9). Accordingly, the compressor 1 has to be operated for long time until the compressor 1 is again stopped due to low-pressure cutoff. It may cause poor defrosting (indicated by arrow (E) in FIG. 9).

In the refrigeration cycle apparatus 100, while the compressor 1 is reactivated so as to return from the pump-down stopped state (low-pressure cutoff), the solenoid valve 6 is opened and the solenoid valve 7 is closed. If the solenoid valve 6 is opened upon activation, the compressor may fail to be activated because of the reason described in [Timing of Opening and Closing of Solenoid Valves 6 and 7 during Activation of Compressor 1] in Embodiment 1. Accordingly, a dilemma occurs between activation performance and pump-down performance.

When returning from the pump-down stopped state, however, the compressor 1 (particularly, the compressors 11 and 12 in Embodiment 2) which has been stopped is activated. In this case, the pressure on the liquid outlet is substantially equal to the discharge pressure of the compressor in the refrigeration cycle apparatus according to Embodiment 3. The pressure relationship in the compressor (each of the compressors 11 and 12) in Embodiment 2 is expressed as suction side: intermediate port: discharge side=low: high: high. Accordingly, the activation performance is slightly improved.

To overcome the above dilemma, the time at which the solenoid valve 6 is opened may be slightly shifted (to a high-frequency side) as described below and the refrigerant may be injected into the intermediate port of the compressor 1 in a more stable operation state while torque acting on the compressor 1 is small, unless an increase in discharge temperature is large. If the discharge temperature is high, the abnormal discharge temperature may cause the compressor 1 to be stopped. Accordingly, parameters to determine the time at which the refrigerant is injected include the discharge temperature in addition to the frequency of the compressor 1.

Specifically, the solenoid valve 6 is opened at the time when the driving frequency of the compressor 1 is at or above a predetermined frequency (e.g., 45 Hz) or the discharge temperature is at or above a predetermined temperature (e.g., 90 degrees C.). If the compressor 1 cannot be activated under this control, the control described in Embodiment 1 is performed at the next and subsequent activation times.

As described above, while the compressor 1 is stopped, the solenoid valves 6 and 7 are closed ((1) in FIG. 7(a), S21 and S22 in FIG. 7(b)). While the compressor 1 is reactivated so as to return from the pump-down stopped state (low-pressure cutoff), the solenoid valve 6 is opened and the solenoid valve 7 is closed ((2) in FIG. 7(a), S24 in FIG. 7(b)). At this time, in the refrigeration cycle apparatus according to Embodiment 3, whether the driving frequency of the compressor 1 is at or above the predetermined frequency (e.g., 45 Hz) or the discharge temperature is at or above the predetermined temperature (e.g., 90 degrees C.) is determined (S23 in FIG. 7(b)). After that, the same controls (control for the normal operation and control for reducing the temperature of the motor of the compressor 1) as those described in Embodiment 1 are performed.

Specifically, the refrigeration cycle apparatus according to Embodiment 3 is configured such that the control for activation of the compressor 1 which has been stopped due to low-pressure cutoff differs from the above-described control for activation of the compressor 1 in Embodiment 1. Which of the control for activation of the compressor 1 described in Embodiment 1 and that described in Embodiment 3 should be performed may be determined in accordance with a flowchart illustrated in FIG. 8. Specifically, the controller 50 determines whether the compressor 1 stopped due to low-pressure cutoff is to be activated (S31 in FIG. 8). If it is so (YES in S31 in FIG. 8), the control for activation of the compressor 1 described in Embodiment 3 is performed (S33 in FIG. 8). Otherwise (NO in S31 in FIG. 8), the control for activation of the compressor 1 described in Embodiment 1 is performed (S32 in FIG. 8). Information about a reason why the compressor 1 has been stopped may be stored in, for example, storage means of the controller 50.

As described above, the refrigeration cycle apparatus according to Embodiment 3 offers the advantages of the refrigeration cycle apparatus according to Embodiment 1 or Embodiment 2 and further prevents undesirable pump-down conditions, likely to be caused in a normal mechanism, by performing solenoid valve control different from that for normal activation of the compressor 1 to activate the compressor 1 which has been stopped due to low-pressure cutoff.

The features of the present invention have been described above with respect to Embodiments 1 to 3. The controls described in Embodiments 1 to 3 are intended for four main purposes.
(1) Control for improving the activation performance of the compressor during activation of the refrigeration cycle apparatus (Embodiments 1 and 2)
(2) Control for enhancing the refrigeration capacity in the normal operation of the compressor 1 (Embodiments 1 and 2)
(3) Control for reducing the temperature of the motor of the compressor (or the temperature of the refrigerating machine oil) when the temperature rises in the normal operation of the compressor 2 (Embodiments 1 and 2)
(4) Control for preventing undesirable pump-down conditions using the controls described in Embodiment 1 (Embodiment 3)

Accordingly, the refrigeration cycle apparatuses according to Embodiments 1 to 3 can achieve injection control for improving the activation performance of the compressor. Additionally, the refrigeration cycle apparatuses according to Embodiments 1 to 3 can achieve injection control for reducing the temperature of the motor of the compressor (or the temperature of oil in the compressor) without reducing the refrigeration capacity. Furthermore, the refrigeration cycle apparatuses according to Embodiments 1 to 3 can prevent undesirable pump-down conditions during activation of the compressor 1 which has been stopped due to low-pressure cutoff.

Since the above-described control patterns are just examples, the control patterns may be changed for the purposes (1) to (4). Furthermore, the control patterns may be appropriately combined for any use or application of the refrigeration cycle apparatus.

REFERENCE SIGNS LIST 1, compressor; 2, condenser; 3, reservoir; 4, subcooling coil; 5, electronic expansion valve; 6, solenoid valve; 7, solenoid valve; 8, accumulator; 11, compressor; 12, compressor; 21, condenser; 22, condenser; 30, reservoir; 41, subcooling coil; 42, subcooling coil; 50, controller; 51, electronic expansion valve; 52, electronic expansion valve; 55, injection circuit; 55a, injection circuit; 55b, injection circuit; 56, bypass; 56a, bypass; 56b, bypass; 61, solenoid valve; 62, solenoid valve; 71, solenoid valve; 72, solenoid valve; 81, accumulator; 82, accumulator; 91, check valve; 92, check valve; 100, refrigeration cycle apparatus; and 200, refrigeration cycle apparatus.

The invention claimed is:

1. A refrigeration cycle apparatus comprising:
a heat source side circuit in which at least one compressor configured to compress a refrigerant and discharge the refrigerant, a condenser configured to exchange heat between the refrigerant discharged from the compressor and a heat medium, and a subcooling coil configured to subcool the refrigerant flowing from the condenser are connected by pipes;
an injection circuit that branches off at a downstream side of the subcooling coil in the heat source circuit and connects through the subcooling coil to an intermediate pressure portion of the compressor;
a bypass that branches off at a downstream side of the subcooling coil in the injection circuit and connects to a suction side of the compressor;
a first solenoid valve disposed closer to the compressor than a connection point between the injection circuit and the bypass;
a second solenoid valve disposed in the bypass; and
a controller configured to
control a frequency of the compressor, opening and closing of the first solenoid valve, and opening and closing of the second solenoid valve,
wherein the controller controls the opening and closing of the first and second solenoid valves depending on any of a time when the compressor is activated, a time when the compressor is in normal operation, a time when a temperature of a motor of the compressor rises in the normal operation, or a time when the compressor is reactivated so as to return from a stopped state due to low-pressure cutoff,
the controller is configured to (i) control both of the first solenoid valve and the second solenoid valve to remain in a closed position during a first time, the first time being when the compressor is in the stopped state due to low-pressure cutoff; and (ii) control the first solenoid valve to be opened from the closed position and the second solenoid valve to remain in the closed position during a second time, the second time being when the compressor is reactivated so as to return from the stopped state due to low-pressure cutoff.

2. The refrigeration cycle apparatus of claim 1, wherein when the compressor is activated, the controller closes the first solenoid valve and opens the second solenoid valve.

3. The refrigeration cycle apparatus of claim 1, wherein when the compressor is in the normal operation, the controller opens the first solenoid valve and closes the second solenoid valve.

4. The refrigeration cycle apparatus of claim 3, wherein when the frequency of the compressor reaches a predetermined frequency or higher after start of activation of the compressor, the controller determines that the compressor is in a normal operation condition.

5. The refrigeration cycle apparatus of claim 1, wherein when the temperature of the motor of the compressor has risen in the normal operation, the controller opens the second solenoid valve.

6. The refrigeration cycle apparatus of claim 5, wherein when a temperature of a shell of the compressor is higher than or equal to a predetermined temperature, the controller determines that it is the time when the temperature of the motor of the compressor has risen.

7. The refrigeration cycle apparatus of claim 1, wherein when the frequency of the compressor reaches a predetermined frequency or higher or when a discharge temperature of the refrigerant discharged from the compressor reaches a predetermined temperature or higher, the controller opens the first solenoid valve.

8. The refrigeration cycle apparatus of claim 1, further comprising:
storage memory that stores information about a reason why the compressor has been stopped,
wherein the controller determines on the basis of the information stored in the storage memory whether the compressor has been stopped due to low-pressure cutoff.

9. The refrigeration cycle apparatus of claim 1, wherein the at least one compressor comprises at least two compressors connected in parallel with each other.

10. The refrigeration cycle apparatus of claim 7, further comprising:
storage memory that stores information about a reason why the compressor has been stopped,
wherein the controller determines on the basis of the information stored in the storage memory whether the compressor has been stopped due to low-pressure cutoff.

11. The refrigeration cycle apparatus of claim 1, wherein the controller is further configured to
determine whether the compressor operates,
when it is determined that the compressor does not operate, control both of the first solenoid valve and the second solenoid valve to be closed;
when it is determined that the compressor operates,
determine whether the compressor is reactivated so as to return from the stopped state due to low-pressure cutoff, based on the frequency of the compressor or a discharge temperature of the refrigerant discharged from the compressor.

12. The refrigeration cycle apparatus of claim 11, wherein the controller is further configured to
when it is determined that the compressor is reactivated so as to return from the stopped state due to low-pressure cutoff,
after controlling the first solenoid valve to be open and the second solenoid valve to be closed, determine whether the temperature of the motor of the compressor has risen based on the temperature of a lower part of a shell of the compressor,
when it is determined that the temperature of the motor of the compressor has risen, control the second solenoid valve to be open.

* * * * *